United States Patent

[11] 3,571,571

[72] Inventor Christos B. Kapsambelis
Canton, Mass.
[21] Appl. No. 767,213
[22] Filed Oct. 14, 1968
[45] Patented Mar. 23, 1971
[73] Assignee Sylvania Electric Products Inc.

[54] INFORMATION PROCESSING SYSTEMS
12 Claims, 6 Drawing Figs.

[52] U.S. Cl. .......... 235/61.11, 340/146.3
[51] Int. Cl. .......... G06k 7/12
[50] Field of Search .......... 235/61.115; 340/146.3 (RR), 174.1 (B) (A); 235/61.11

[56] References Cited
UNITED STATES PATENTS

| | | | |
|---|---|---|---|
| 2,628,346 | 2/1953 | Burkhart | 340/174.1B |
| 3,102,995 | 9/1963 | Abbott | 340/146.3 |
| 3,106,706 | 10/1963 | Kolanowski | 340/146.3X |
| 3,111,645 | 11/1963 | Milford | 340/146.3 |
| 3,111,646 | 11/1963 | Harmon | 340/146.3 |
| 3,225,177 | 12/1965 | Stites | 235/61.115 |
| 3,235,855 | 2/1966 | Way Dong Woo | 340/146.3X |
| 3,417,231 | 12/1968 | Stites | 235/61.115 |

*Primary Examiner*—Daryl W. Cook
*Assistant Examiner*—Robert M. Kilgore
*Attorneys*—Norman J. O'Malley, Elmer J. Nealon and Peter Xiarhos

ABSTRACT: A coded vehicle identification system including a label-data recognition arrangement for recognizing data derived in response to scanning a coded retroreflective label affixed to a vehicle and for preventing the processing of noise signals occurring during the scanning of the label. The label comprises a vertical array of rectangular orange, blue, and white retroreflective stripes and black nonretroreflective stripes arranged in a plurality of two-stripe combinations to represent, in a two-position base-four code format, information pertaining to the vehicle. Distinguishable coded START and STOP stripe-pairs are provided at opposite ends of the array to respectively initiate and terminate processing of the data content of the label.

Figure 1:
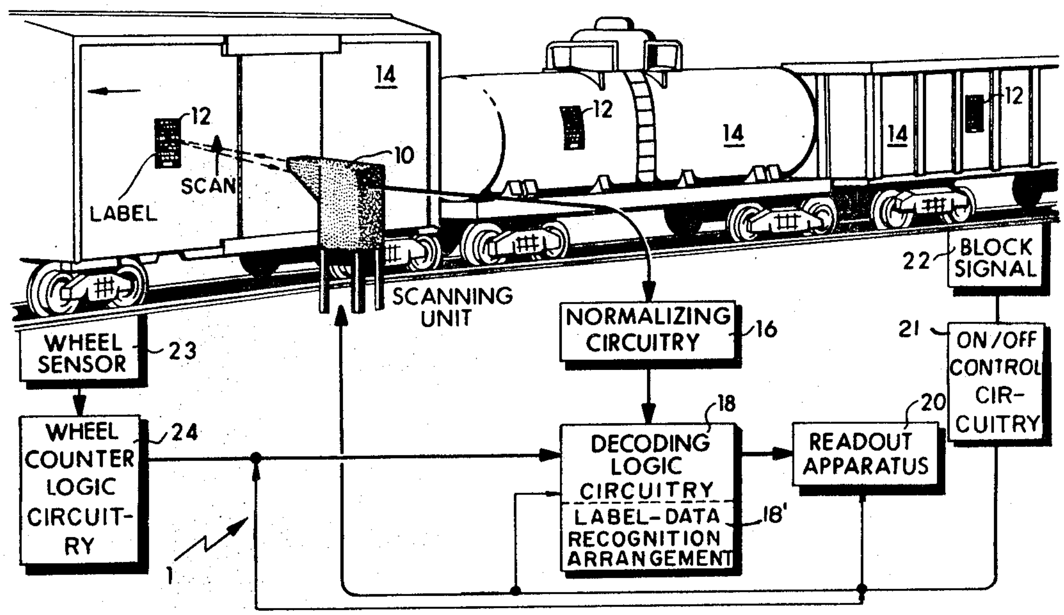

The individual light patterns retroreflected from the plurality of coded pairs of stripes, in response to being successively scanned, are converted into corresponding coded electrical signals and entered sequentially, by means of shift pulses initiated by the coded electrical signals, into successive stages of a plurality of storage shift registers. A label-data recognition arrangement is provided for allowing the coded electrical signals stored in the shift registers to be applied to a readout apparatus if the coded signals are recognized to be label data. If, at any time, however, a signal is recognized not to be label data, for example, a noise signal derived from a source extraneous to the label, all of the stages of the registers are reset.

*INVENTOR*
CHRISTOS B. KAPSAMBELIS
*BY* Peter Xiarhos
*AGENT*

INVENTOR
CHRISTOS B. KAPSAMBELIS
BY Peter Xiarhos
AGENT

PATENTED MAR 23 1971 3,571,571

SHEET 3 OF 3

INVENTOR
CHRISTOS B. KAPSAMBELIS

BY Peter Xiarhos

AGENT

INFORMATION PROCESSING SYSTEMS

BACKGROUND OF THE INVENTION

The present invention relates to an automatic vehicle identification system. More particularly, it is concerned with an automatic vehicle identification system employing a label-data recognition arrangement for allowing the processing of coded signals derived in response to scanning coded labels affixed to vehicles and for preventing the processing of noise signals derived from sources extraneous to the labels.

One well known automatic vehicle identification system for deriving identification information from coded retroreflective labels affixed to railway vehicles is described in detail in U.S. Pat. No. 3,225,177, to Francis H. Stites and Raymond Alexander, assigned to the same assignee as the present application. In the above-mentioned patented system, a vehicle is provided with a vertically-oriented retroreflective label including, in a vertical array, a plurality of rectangular retroreflective orange, blue, and white stripes, and nonretroreflective black stripes. The stripes of the four colors are arranged in a plurality of pair combinations, in accordance with a two-position base-four code format, to represent the identity or other information pertaining to the vehicle. Distinguishable coded START and STOP stripe-pairs, representing START and STOP control words, respectively, are also provided at opposite ends of the array of stripe-pairs to respectively initiate and terminate processing of the data content of the label.

In the operation of the above-mentioned system, as the labeled vehicle passes a predetermined label-reading location, the coded data is sensed from the label by means of an optical-scanning apparatus which vertically scans the label from bottom to top with an incident beam of light. The light patterns reflected in succession from the retroreflective stripe-pairs of the label as the stripe-pairs are successively scanned are returned along the path of the incident light and converted into successive coded electrical signals representative of the data encoded in the stripe-pairs. The coded electrical signals are entered in a sequential fashion into the stages of a plurality of storage shift registers. Specifically, the coded electrical signal representative of the START control word is entered first into the shift registers and progressively shifted through the various stages of the shift registers by the subsequently-derived coded electrical signals representative of the vehicle data and, finally, the STOP control word. Thus, after completion of the scanning and light conversion operations on the entire label, the coded signal representative of the START control word is present in the last stages of the shift registers and the coded signal representative of the STOP control word is present in the first stages.

In the above-described system, the presence of label data in the storage shift registers is recognized by a first signal-sensing gate connected to the last stages of the registers and operative to sense the presence of the "START" coded signal therein, and a second signal-sensing gate connected to the first stages of the registers and operative to sense the presence of the "-STOP" coded signal therein. If both the "START" and "-STOP" coded signals are recognized simultaneously by the aforementioned gates, only valid label signals are assumed to be present in the registers, and a readout signal is produced to cause the contents of the registers to be shifted out of the registers into appropriate readout apparatus.

The above-described system has performed very satisfactorily in many applications and under many types of operating conditions to sense data from vehicle labels of the above-described type and to process such sensed data. However, under certain adverse operating and environmental conditions, it is possible for "noise" signals to be produced and processed and to cause improper operation. For example, in reading a label covered by dirt, snow, or other foreign matter, or in reading a label exposed to bright direct sunlight or a label affixed to a shiny or rust-colored surface, it is possible for a randomly-occurring noise signal resembling a "START" coded signal and a randomly-occurring noise signal resembling a "STOP" coded signal to occur due to the above-mentioned extraneous sources and to be entered simultaneously into the last and first stages, respectively, of the registers. Under these conditions, both noise signals are improperly recognized by the signal-sensing gates to be valid label signals and, as a result, only valid label data is assumed to be present in the registers. A readout signal is then produced causing the contents of the registers to be improperly applied to the readout apparatus.

One automatic vehicle identification system that has been employed very successfully and satisfactorily to reduce the amount of undesirable processing of randomly-occurring noise signals is described in detail in a copending patent application of Francis H. Stites and Bradstreet J. Vachon, entitled "Mark Sensing System," Ser. No. 386,328, filed Jul. 30, 1964, now U.S. Pat. No. 3,417,231, and assigned to the same assignee as the present application.

In the system disclosed in the above-cited patent to Stites and Vachon, coded electrical signals are derived from a two-position base-four encoded retroreflective label and entered into a plurality of storage shift registers in substantially the same manner as described hereinabove in connection with the patent to Stites and Alexander. Additionally, in the same manner as in the system of the patent to Stites and Alexander, the presence of a "START" coded signal is sensed in the last stages of the registers simultaneously with the sensing of the presence of a "STOP" coded signal in the first stages of the registers. However, the system of the patent of Stites and Vachon, in addition to requiring that a "START" coded signal be present in the last stages of the registers at the same time that a "STOP" coded signal is present in the first stages of the registers, imposes the additional requirement that the "-START" and "STOP" coded signals (and the intermediate coded signals) all be produced within a predetermined fixed time duration, the time duration being slightly greater than the time required to scan a label (approximately 900 microseconds). The predetermined fixed time duration begins to run when the "START" coded signal is produced. In the above fashion, by looking at signals produced only during small (900 microsecond) time durations, rather than all of the signals produced during each scan, the likelihood of valid label data being present in the shift registers after a label-reading operation is increased, and the likelihood of randomly-occurring signals causing improper readout of the contents of the registers is reduced.

While the system of the Stites and Vachon patent has operated very successfully and satisfactorily as indicated hereinabove, there still exists, under the adverse operating and environmental conditions of the type previously mentioned, the possiblity of noise signals resembling "START" and "-STOP" coded signals to be produced and to be present simultaneously in the last and first stages, respectively, of the shift registers, and to occur at the appropriate times within the predetermined 900 microsecond time duration. Under these conditions, a readout signal will be produced causing the contents of the shift registers to be improperly applied to the readout apparatus. Since, in a nationwide railway vehicle identification network, several thousand interstate and intrastate railway vehicles owned by many different railroads must be properly identified every day in order for the railroads to be able to render proper charges, credits, billings, and data to each other, it is apparent that any minimizing or reduction of the error rate of a vehicle identification system is highly desirable.

SUMMARY OF THE INVENTION

Briefly, the present invention relates to a system for processing information relating to an object, for example, a railway vehicle. In accordance with the present invention, a plurality of code elements are associated with the object and arranged in a predetermined coded pattern so as to represent in an orderly fashion a plurality of items of information relating to the object. In the operation of the system, the items of information encoded in the plurality of code elements are sensed by a sensing means and electrical signals representative thereof are applied to a signal-processing means which is adapted to process the electrical signals. In order to determine whether the electrical signals produced by the sensing means correspond to and are representative of the items of information encoded in the plurality of code elements, more particularly, that the electrical signals produced by the sensing means are not caused by noise-producing sources extraneous to the code elements, a control signal corresponding to each electrical signal produced by the sensing means is generated by a control signal-generating means. Means are provided to compare the time duration between successive ones of the control signals with a predetermined time duration and to clear the signal-processing means of the electrical signals being processed thereby if the time duration between any pair of successive control signals differs from the predetermined time duration. In accordance with the present invention, the predetermined time duration is selected to be equal to the expected time duration between successive ones of the control signals corresponding to the electrical signals produced by the sensing means if the electrical signals correspond to and are representative of the items of information encoded in the code elements rather than corresponding to noise signals caused by noise-producing sources.

Figure 2:
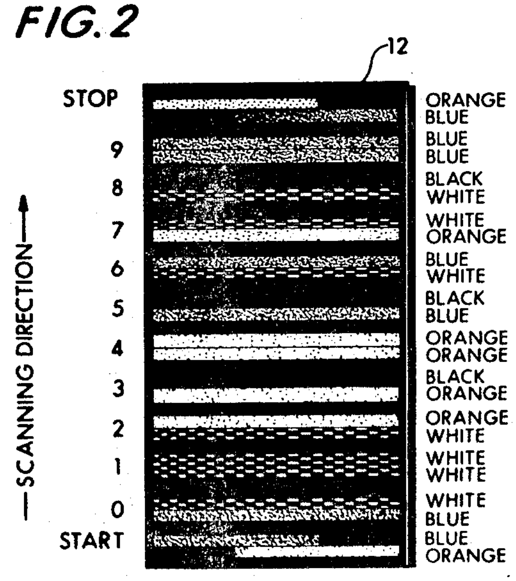
Figures 3A, 3B, 3C:
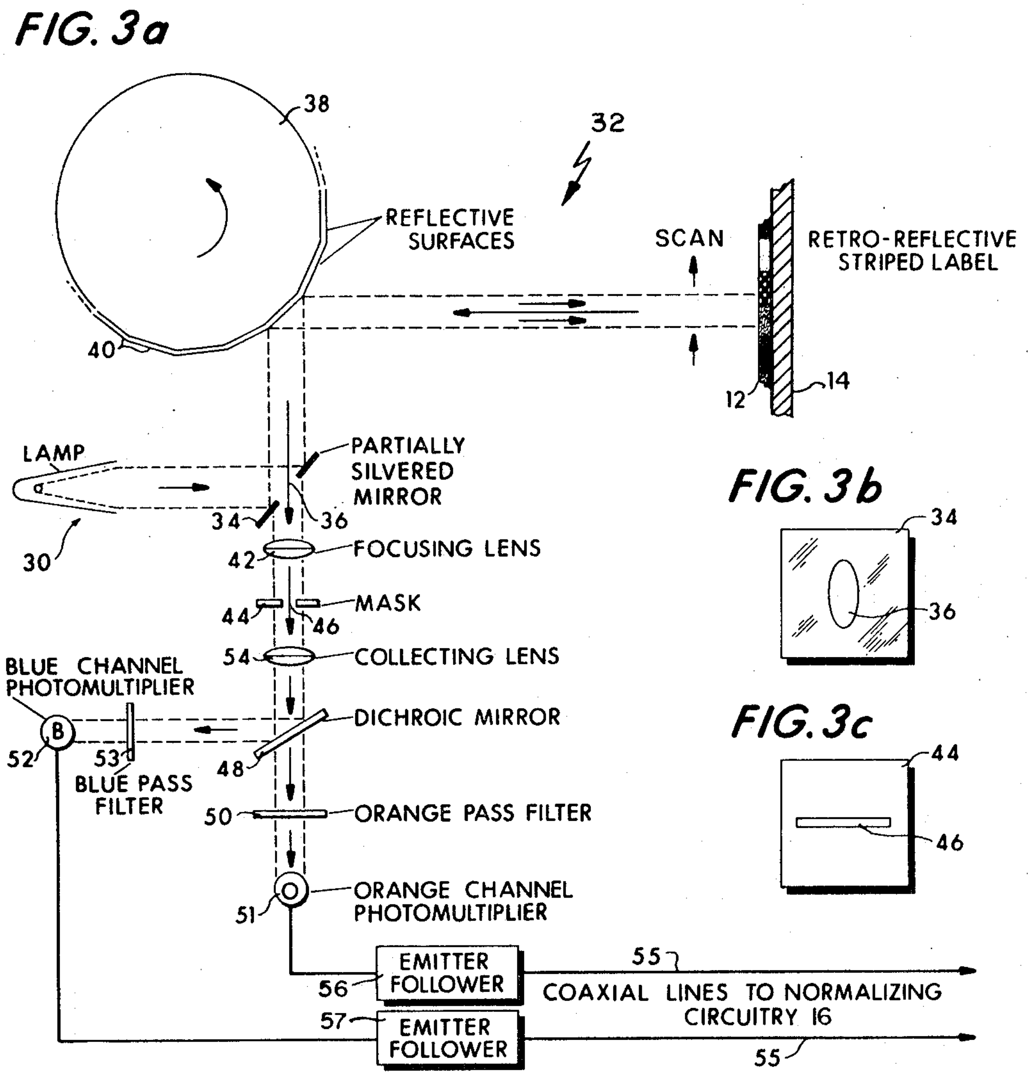
Figure 4:
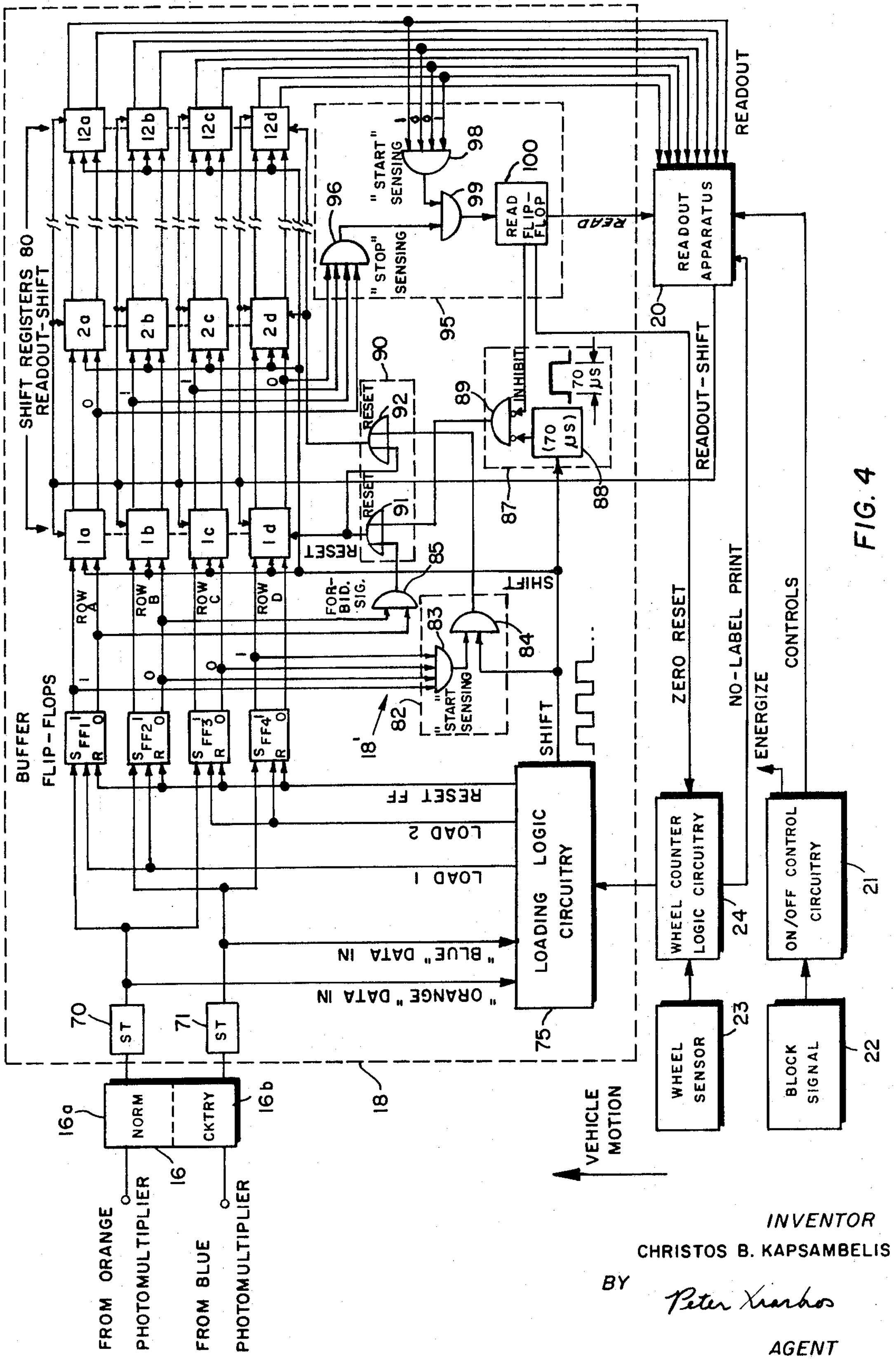

As will be described in detail hereinafter, additional means are provided which are operative to sense the electrical signals produced by the sensing means, or portions thereof, and to cause clearing of the signal-processing means or particular sections of the signal-processing means in response to sensing particular electrical signals or characteristics thereof. BRIEF DESCRIPTION OF THE DRAWING FIG. 1 is a diagrammatic representation partially in block diagram form of an automatic vehicle identification system including a label-data recognition arrangement in accordance with the present invention;

FIG. 2 is a diagrammatic representation of an exemplary two-position base-four coded retroreflective label employed in the automatic vehicle identification system of FIG. 1;

FIG. 3*a* is a diagrammatic representation of an optical system and electrical transducers employed in the automatic vehicle identification system of FIG. 1;

FIG. 3*b* is a plan view of a partially-silvered mirror employed in the optical system of FIG. 3*a*;

FIG. 3*c* is a plan view of an optical mask employed in the optical system of FIG. 3*a*; and FIG. 4 is a diagrammatic representation in block diagram form showing in greater detail than FIG. 1 various portions of the automatic vehicle identification system of FIG. 1.

GENERAL DESCRIPTION OF THE INVENTION–FIG. 1

Referring to FIG. 1, there is shown in partial block diagram form an automatic vehicle identification system 1 in accordance with the present invention. As shown in FIG. 1, a trackside scanning unit 10 is provided to vertically scan a light beam across a coded retroreflective label 12 affixed to the side of a railroad car 14. A typical form of the label 12 is shown in detail in FIG. 2. The scanning unit 10 may be located several feet from the track and typically scans a vertical distance of about 6 feet. Thus, the label 12 can be placed on the railroad car 14 anywhere within the 6-foot distance and still be read by the scanning unit 10. Light reflected from the label 12 is returned to and received by the scanning unit 10 and transduced thereby into electrical signals which are then applied to normalizing circuitry 16.

The normalizing circuitry 16 operates to remove most of the distortion of the electrical signals received from the scanning unit 10 and to provide standardized pulses representative of the information encoded in the label 12. Typically, the above-mentioned distortion of the electrical signals from the scanning unit 10 may be caused by such factors as the vibration or swaying of the vehicle 14 as it passes the scanning unit 10, changes in optical focusing, irregularities or damage to the label itself due to weathering or dirt, slight misalignment between the label and optical apparatus included in the scanning unit 10, or amplitude variations in the ambient light received by light-responsive transducers included in the scanning unit 10. Suitable normalizing circuitry which may be used in the vehicle identification system 1 of FIG. 1 is disclosed in detail in U.S. Pat. No. 3,299,271, to Francis H. Stites, and in U.S. Pat. No. 3,328,590, to Christos B. Kapsambelis, both patents being assigned to the same assignee as the present application.

The standardized pulses produced by the normalizing circuitry 16 are decoded by decoding logic circuitry 18 which includes a label-data recognition arrangement 18′. As will be described in detail hereinafter, the purpose of the label-data recognition arrangement 18′ is to cause the coded signals representative of the data encoded in the label 12, to be described hereinafter and applied to and stored in data storage apparatus included in the decoding logic circuitry 18 to be applied to a readout apparatus 20 once it has been determined that the signals are label-derived signals and not noise signals caused by sources extraneous to the label 12, for example, dirt, rain, or snow that might be present on the label 12, or sources such as the side of the railroad car 14, or the sun.

The vehicle identification system 1 of FIG. 1 is in an inoperative condition until a railroad car, such as shown at 14 in FIG. 1, enters the signal block within which the scanning unit 10 is located. When the railroad car 14 enters the signal block, a command from a block signal 22, a standard item of railroad signalling equipment, actuates the trackside scanning unit 10 and the associated electronics via ON/OFF control circuitry 21. A wheel sensor 23 and a wheel counter logic circuitry 24 are also employed to sense the presence of the wheels of the vehicle 14 and to provide signals to the decoding logic circuitry 18 and to the readout apparatus 20 concerning unlabeled or unreadable cars.

The normalized circuitry 16, the decoding logic circuitry 18, and the readout apparatus 20 are usually, although not necessarily, located remote from the trackside scanning unit 10 and are serviced by a transmission line link. Since the signal data rate in a practical embodiment of the invention is below 65 kilohertz, no compensation or amplification is needed for cable runs up to about 2 miles.

A detailed description of the label 12, the optical portions of the scanning unit 10, and the decoding logic circuitry 18 will now be presented.

LABEL–FIG. 2

The coded retroreflective label 12, illustrated in detail in FIG. 2, is typically fabricated from a plurality of rectangular orange, blue, and white retroreflective stripes, and nonretroreflective black stripes. The orange, blue, and white retroreflective stripes have the capability of reflecting incident light directed thereon along the path of incidence whereas the black stripes effectively lack such a capability of retroreflection. The label 12, as shown in FIG. 2, is coded in a two-position base-four code by various two-stripe combinations of the retroreflective orange, blue, and white stripes and the nonretroreflective black stripes, to represent, in a sequential format, items of information pertaining to the vehicle on which the label 12 is affixed. As shown in FIG. 2, the items of information comprise a START control word, a plurality of exemplary digits 0 through 9, and a STOP control word.

The coded stripe-pairs of the label 12 are separated by black nonreflecting spacers and are surrounded on the edges by a black nonreflecting border. The purpose of the nonreflecting spacers is to isolate the stripe-pairs from each other so as to facilitate processing of the data encoded in the stripe-pairs. The nonreflecting border serves to isolate the stripes of the label 12 from the background on which the label 12 is affixed thereby to prevent unwanted reflections from the background from interfering with the proper reading of the label and from causing false triggering of the circuitry employed to process the data content of the label.

The START stripe-pair and the STOP stripe-pair, in response to being scanned, serve to respectively initiate and terminate processing of the data content of the label 12. As may be noted from FIG. 2, the individual stripes of the START stripe-pair and the STOP stripe-pair are shorter than the other stripes of the label 12 and overlap each other at a central region of the label 12. The purpose of this arrangement is to initiate reading of the label 12 only when a significant part of the label is within the field of the scanning unit 10. In this fashion, any foreign matter which may be present on the vehicle adjacent to the vertical edges of the label 12, or any painted alpha-numeric characters commonly present on the vehicle adjacent to the vertical edges of the label 12, do not interfere with the proper reading of the label 12. Additionally, if the vertical edges of the label 12 becomes tattered or otherwise deteriorated, the staggered arrangement of the START and STOP stripe-pairs prevents a reading of the label 12 on either edge and therefore minimizes the occurrence of an improper reading of the label.

As may also be noted from FIG. 2, a number of black areas are included in the white stripes of the label 12. The black areas are nonreflecting and serve to reduce the reflectivity of the white stripes to essentially equal that of the colored stripes. This use of nonreflecting black areas is desirable inasmuch as completely white stripes have the tendency to reflect light having a greater amplitude than light reflected from the other stripes, the result being that signal processing by the normalizing circuitry may be undesirably affected.

In a vehicle identification system which has operated satisfactorily, the vehicle-identifying label stripes of the label 12 are 6 inches long and three-eighths inch wide, and the black nonreflecting spacers between stripe-pairs are one-half inch. The individual stripes of the START and STOP stripe-pairs are each 4 inches long and overlap each other by approximately 2 inches so that the reading of the label is not initiated until approximately 2 inches of the label is in view of the scanning apparatus.

OPTICAL SYSTEM

FIG. 3*a* is a diagrammatic representation of an optical system 32 incorporated in the scanning unit 10 of FIG. 1 for reading the label 12 shown in FIG. 2. As shown in FIG. 3*a*, the optical system 32 comprises: a rotating wheel 38 having a plurality of reflective mirror surfaces 40 on its periphery; a lamp 30; a partially-silvered mirror 34 provided with an elliptical aperture 36, shown more clearly in the plan view of FIG. 3*b;* a focusing lens 42; a mask 44 provided with a rectangular viewing slot 46, shown more clearly in the plan view of FIG. 3*c;* a collecting lens 54; a dichroic mirror 48; an orange pass filter 50; a blue pass filter 53; an orange channel photomultiplier 51; a blue channel photomultiplier 52; and a pair of emitter followers 56 and 57 connected, respectively, to the orange channel photomultiplier 51 and to the blue channel photomultiplier 52. Although reference may be made to the above-cited patent to Stites and Alexander or to the above-cited patent of Stites and Vachon for a detailed description of the optical system 32 of FIG. 3*a*, for purposes of a fuller understanding of the present invention, a brief description of the operation will be presented.

As the railroad car 14 bearing the coded retroreflective label 12 is presented to the optical system 32, an incident beam of light from the lamp 30 is reflected by the partially-silvered mirror 34 onto the reflective mirror surfaces 40 of the rotating wheel 38. The light received by the reflective mirror surfaces 40 is further reflected onto the label 12 upon a rotation motion being imparted to the rotating wheel 38 by a suitable motor (not shown). The rotating wheel 38 typically is 14 inches in diameter, has 15 reflective mirror surfaces 40 on its periphery, rotates at 1200 revolutions per minute, and is located approximately 6 feet from the railroad car 14.

The light directed onto the label 12, as indicated in FIG. 3*a*, is retroreflected by each of the retroreflective stripes of the label 12 along the path of the incident light. The retroreflected light is returned onto the reflective mirror surfaces 40 of the rotating wheel 38, and then through the elliptical aperture 36 provided in the mirror 34. The elliptical aperture 36 presents a circular transmission path for the light reflected from the label 12 since the diagonal arrangement of the mirror 36 converts the ellipse to an effective circle with respect to the light path.

The retroreflected light which is received from the retroreflective stripes of the coded label 12 as the stripes are successively scanned with the light from the reflective surfaces 40 constitutes the reflected image of the label 12. This reflected image of the label 12 is projected onto the mask 44 by the focusing lens 42. The dimensions of the rectangular viewing slot 46 are established so as to view at one time only a small portion of the entire width of each image of a stripe. Typical dimensions for the rectangular slit 46 are 0.5 inch long and 0.010 inch wide. Each portion of a stripe image sampled by the slit 46 is received by the collecting lens 54 and directed thereby onto the dichroic mirror 48.

As discussed in the above-cited patent to Stites and Alexander and also in the patent of Stites and Vachon, when a four-color label is employed, two channels, an "orange" channel and a "blue" channel, are utilized. The dichroic mirror 48 divides the reflected light from the collecting lens 54 into orange and blue components by transmitting orange light through the orange pass filter 50 to the orange channel photomultiplier 51, and reflecting blue light through the blue-pass filter 53 to the blue channel photomultiplier 52.

The orange and blue stripes of the label 12 of FIG. 2 reflect light in the orange and blue spectrum, respectively. Thus, in response to an orange stripe being scanned, the photosensitive surface of the orange channel photomultiplier 51 is activated, and in response to a blue stripe being scanned, the photosensitive surface of the blue channel photomultiplier 52 is activated. The white stripes of the label 12 of FIG. 2 reflect light in both the orange and blue spectrum. Thus, in response to a white stripe being scanned, the photosensitive surfaces of both the orange channel photomultiplier 51 and the blue channel photomultiplier 52 are activated. As mentioned previously, the black stripes of the label 12 are nonreflecting and, accordingly, do not reflect light in either the orange or blue spectrum. In this case, neither the photosensitive surface of the orange channel photomultiplier 51 nor the photosensitive surface of the blue channel photomultiplier 52 is activated.

The output signals produced by the photomultipliers 51 and 52, in response to the photosensitive surfaces thereof being activated by the light returned from the stripes of the label 12, are applied to the respective emitter followers 56 and 57 which transform the signals to a low impedance for suitable transmission over a pair of coaxial cables 55 to the normalizing circuitry 16 and then to the decoding logic circuitry 18.

DECODING LOGIC CIRCUITRY–FIG. 4

Referring now to FIG. 4, there is shown the decoding logic circuitry 18. As shown, the decoding logic circuitry 18 is provided with a first Schmitt trigger circuit 70 connected at its input to an "ORANGE" normalizing section 16*a* of the normalizing circuitry 16. The output of the Schmitt trigger circuit 70 is connected via an "ORANGE" DATA IN line to a loading logic circuitry 75 and also to the set terminals S of a first pair of buffer flip-flops FF1 and FF3. A second Schmitt trigger circuit 71 is connected at its input to a "BLUE" normalizing section 16*b* of the normalizing circuitry 16. The output of the Schmitt trigger circuit 71 is connected via a "BLUE" DATA IN line to the loading logic circuitry 75 and also to the set terminals S of a second pair of buffer flip-flops FF2 and FF4. As will become fully apparent hereinafter, the Schmitt trigger circuits 70 and 71 are operative, in response to each stripe-pair of the label 12 (FIG. 2) being read, to apply normalized pulses from the normalizing circuitry 16 and representative of the information encoded in the stripe-pairs to the set terminals S of the buffer flip-flops FF1—FF4. Additionally, particular ones of the pulses from the Schmitt trigger circuits 70 and 71 are applied to the loading logic circuitry 75 via the "ORANGE" and "BLUE" DATA IN lines.

The loading logic circuitry 75, which is of a type described in detail in the aforementioned patent to Stites and Alexander or, alternatively, in the aforementioned patent of Stites and Vachon, operates to generate and apply gating signals to a pair of gating lines LOAD 1 and LOAD 2 at fixed times after being energized by the Schmitt trigger circuit 70 or by the Schmitt trigger circuit 71. More particularly, a gating signal is applied to the LOAD 1 line to allow the pulses derived in response to the first stripe of a stripe-pair being scanned to be temporarily stored in the flip-flops FF1 and FF2, and a gating signal is applied to the LOAD 2 line to allow the pulses derived in response to the second stripe of a stripe-pair being scanned to be temporarily stored in the flip-flops FF3 and FF4.

In addition to generating gating signals, the loading logic circuitry 75, at a fixed time after each loading of the buffer flip-flops FF1—FF4 with pulses derived as a result of scanning a stripe-pair, generates and applies a shift pulse over a SHIFT line to a plurality of shift registers 80 to allow the contents of the buffer flip-flops FF1—FF4, in a binary-coded form, to be entered into the shift registers 80. The loading logic circuitry 75 then resets the buffer flip-flops FF1—FF4 by means of a signal applied over a resetting line RESET FF to the reset terminals R of the buffer flip-flops FF1—FF4 to prepare the flip-flops for receipt of the next set of pulses from the Schmitt trigger circuits 70 and 71 derived as a result of scanning the next stripe-pair.

As shown in FIG. 4, the shift registers 80 comprise a plurality of sets of interconnected stages, designated in FIG. 4 as 1*a*—1*d*, 2*a*—2*d*,...., 12*a*—12*d*. Twelve sets of stages 1*a*—1*d* through 12—12*d* are shown in FIG. 4 inasmuch as twelve coded signals, corresponding to the START and STOP control words and 10 intermediate digits are required to be stored in the sets of stages. It is to be appreciated, however, that if less than 10 digits are encoded in a given label, the number of sets of stages of the shift registers is correspondingly reduced. Two shift registers, designated in FIG. 4 as ROW A and ROW C shift registers, are associated with the "orange" channel (orange photomultiplier 51, FIG. 3*a*, Schmitt trigger circuit 70 and the buffer flip-flops FF1 and FF3), and two shift registers, designated as ROW B and ROW D shift registers, are associated with the "blue" channel (blue photomultiplier 52, FIG. 3*d*, Schmitt trigger circuit 71 and the buffer flip-flops FF2 and FF4). Four shift registers A—D are required in the present described example to provide the requisite storage capacity for the label information encoded in accordance with the base-four code format.

As is apparent from the scanning-direction arrows in FIGS. 1 and 2, since the coded label 12 is scanned from bottom to top, the coded signal representative of the START control word ("START" coded signal) is first entered into the registers 80 via the first set of stages 1*a*—1*d*; the "START" coded signal is then shifted successively through the remaining sets of stages 2*a*—2*d* through 12*a*—12*d* by shift pulses from the loading logic circuitry 75 as the successive coded signals representative of the digits encoded in the label, and, finally, the coded signal representative of the STOP control word ("STOP" coded signal), are derived.

To ensure as much as possible that only label-derived data is entered into and stored in the shift registers 80 and to ensure that noise signals are rejected from the system as effectively as possible, a plurality of gating arrangements are provided, each of which will be briefly described here and in greater detail hereinafter. These gating arrangements, shown collectively at 18′ in FIG. 4, comprise a START-RESET gating arrangement 82, a FORBIDDEN SIGNAL AND gate 85, a SHIFT PULSE gating arrangement 87, a REGISTER RESET gating arrangement 90, and a READOUT gating arrangement 95.

The START-RESET gating arrangement 82 comprises a "START" SENSING gate 83 connected to selected output terminals of the buffer flip-flops FF1—FF4, and an AND gate 84 connected to the output of the "START" SENSING gate 83 and to the SHIFT line of the loading logic circuitry 75. The START-RESET gating arrangement 82 operates to detect the presence in the buffer flip-flops FF1—FF4 of a coded signal of the START control word and, in response to detecting such coded signal, to apply a signal to a RESET OR gate 92 of the REGISTER RESET gating arrangement 90 to cause all of the sets of stages of the shift registers 80, exclusive of the first set of stages 1*a*—1*d* which are to store the coded signal representative of the START control word, to be reset.

The FORBIDDEN SIGNAL AND gate 85 is selectively connected to the buffer flip-flops FF1 and FF2 and is operative to detect spurious pulses which may be stored in the flip-flops FF1 and FF2 and which resemble pulses that would be produced were the first stripe of a stripe-pair to be black. In this connection, and as will explained more fully hereinafter, it is to be noted from FIG. 2 that the stripe-pairs of the label 12 are selected such that no stripe-pair has a first stripe which is black. In response to detecting the above-mentioned spurious pulses, a signal is applied by the FORBIDDEN SIGNAL AND gate 85 to a RESET OR gate 91 of the REGISTER RESET gating arrangement 90 and thus to the RESET OR gate 92 to cause all of the sets of stages 1*a*—1*d* through 12*a*—12*d* of the shift registers 80 to be reset.

The SHIFT PULSE gating arrangement 87 comprises a retriggerable one-shot multivibrator 88 connected to the SHIFT line of the loading logic circuitry 75 and a gate 89 coupled to the output of the one-shot multivibrator 88. The SHIFT PULSE gating arrangement 87 operates to determine whether each shift pulse produced by the loading logic circuitry 75 on the SHIFT line and corresponding to a scanned stripe-pair is spaced from the previous shift pulse by a predetermined expected time duration as fixed by the duration of the one-shot multivibrator 88.

As will be explained hereinafter, when the shift pulses produced by the loading logic circuitry 75 in response to the stripe-pairs being scanned occur at evenly-spaced intervals, the presumption is strong that the loading logic circuitry 75 has been properly operated by the Schmitt trigger circuit 70 or the Schmitt trigger circuit 71 and that no noise signals are present in the system. However, when the shift pulses produced by the loading logic circuitry 75 are not evenly-spaced, that is, the time interval between any pair of successive shift pulses exceeds the predetermined expected time duration fixed by the one-shot multivibrator 88, the presumption is strong that the loading logic circuitry 75 has been improperly operated by the Schmitt trigger circuit 70 or the Schmitt trigger circuit 71 and that noise signals are present in the system. In this latter case, the SHIFT PULSE gating arrangement 87 detects any uneven spacing of the shift pulses and produces a signal which is applied to the RESET OR gate 91, and thus to the RESET OR gate 92, to cause all of the sets of stages of the shift registers 80 to be reset.

The READOUT gating arrangement 95 comprises: a "STOP" SENSING gate 96 connected to selected output terminals of the first set of stages 1*a*–1*d* of the shift registers 80; a "START" SENSING gate 98 connected to selected output terminals of the final stages 12*a*—12*d* of the registers 80; an AND gate 99 connected at a first input to the "STOP" SENSING gate 96 and at a second input to the "START" SENSING gate 98; and a READ flip-flop 100 connected at its input to the AND gate 99 and at its outputs to an inhibit input of the gate 89, to the wheel counter logic circuitry 24, and to the readout apparatus 20. The READOUT gating arrangement 95 operates to cause the contents of the shift registers 80 to be shifted out into the readout apparatus 20 in response to sensing the simultaneous presence of a "STOP" coded signal in the first set of stages 1*a*—1*d* and a "START" coded signal in the last set of stages 12*a*—12*d*.

DETAILED OPERATION–FIG. 4

The detailed operation of the decoding logic circuitry 18 and the associated apparatus shown in FIG. 4 will now be described.

When a vehicle 14 passes the block signal 22, the block signal 22 activates power sources (not shown) which energize the various circuits in the system. Additionally, the ON/OFF control circuitry 21 is activated by the block signal 22 to initially energize the readout apparatus 20. Data is prevented from entering the decoding logic circuitry 18 until the first wheel of the vehicle 14 passes the wheel sensor 23. When the first wheel passes the wheel sensor 23, the wheel sensor 23 produces an output signal to operate the wheel counter logic circuitry 24 which in turn prepares the loading logic circuitry 75 for operation. If, for some reason, the vehicle is unlabeled or the label is unreadable, signals are applied by the wheel counter logic circuitry 24 over a NO-LABEL PRINT line to the readout apparatus 20 to provide an indication that the vehicle is unlabeled or that the label is unreadable.

When the label 12 affixed to the vehicle 14 is in the field of view of the scanning unit 10, (FIG. 1), the first portion of the label 12 that is scanned is the START stripe-pair. As may be noted from FIG. 2, the first and second stripes of the START stripe-pair are orange and blue, respectively. In response to scanning the orange and blue stripes of the START stripe-pair, respective output pulses are provided by the orange and blue channel photomultipliers 51 and 52, FIG. 3*a*, to the respective "ORANGE" and "BLUE" sections 16*a* and 16*b* of the normalizing circuitry 16, and to the respective Schmitt trigger circuits 70 and 71. Since the orange stripe is scanned first, the Schmitt trigger circuit 70 is operated first. The Schmitt trigger circuit 70 operates to apply the "ORANGE" pulse to the set terminals S of the buffer flip-flops FF1 and FF2 and also to the loading logic circuitry 75 via the "ORANGE" DATA IN line.

As mentioned previously, the loading logic circuitry 75 may be of a type described in detail in the aforementioned patent to Stites and Alexander or, alternatively, of a type described in the aforementioned patent of Stites and Vachon. Although the loading logic circuitry 75 will be described here to the extent necessary to understand the present invention, reference may be made to the patent to Stites and Alexander or the patent of Stites and Vachon for further details. The loading logic circuitry 75, in response to receiving the "ORANGE" pulse from the Schmitt trigger circuit 70, generates on the leading edge of the "ORANGE" pulse, a first gating pulse on the LOAD 1 line of a duration equal to the duration of the pulse expected during this time interval. As is described in the patent to Stites and Alexander and in the patent of Stites and Vachon, the first gating pulse is produced at a fixed period of time after being set into operation by the pulse from the Schmitt trigger circuit 70.

The first gating pulse is applied by the loading logic circuit 75 to the buffer flip-flops FF1 and FF2 to enable these flip-flops as a result of which the "ORANGE" pulse is entered by the Schmitt trigger circuit 70 into the buffer flip-flop FF1. It is to be noted that no pulse is stored in the buffer flip-flop FF2 since no "BLUE" pulse is produced by the Schmitt trigger circuit 71 during the scan of the first stripe (orange) of the START stripe-pair.

At a fixed period of time after producing the first gating pulse, a second gating pulse is produced by the loading logic circuitry 75 over the LOAD 2 line and applied to the buffer flip-flops FF3 and FF4. The second gating pulse brackets the time interval during which a signal pulse from the second stripe (blue) is expected. The buffer flip-flops FF3 and FF4 are enabled and the "BLUE" pulse from the Schmitt trigger circuit 71, previously applied to the set terminals S of the flip-flops FF2 and FF4, is entered into the flip-flop FF4. It is to be noted that no pulse is stored in the flip-flop FF3 since no "ORANGE" pulse is produced by the Schmitt trigger circuit 70 during the scan of the second stripe (blue) of the START stripe-pair. It is apparent from the above discussion, therefore, that the buffer flip-flops FF1 and FF2 store the pulses derived as a result of scanning a first stripe of a stripe-pair and the flip-flops FF3 and FF4 store the pulses derived as a result of scanning the second stripe of the stripe-pair. Since, as a result of scanning the START stripe-pair, pulses are stored in the buffer flip-flops FF1 and FF4 and no pulses are stored in the buffer flip-flops FF2 and FF3, the contents of the flip-flops FF1—FF4 may be represented in a binary form by 1001.

Once the pulses derived as a result of scanning the START stripe-pair have been entered into the buffer flip-flops FF1—FF4, the START binary contents of the flip-flops FF1—FF4 are sensed by the "START" SENSING gate 83 included in the START-RESET gating arrangement 82. As indicated in FIG. 4, the "START" SENSING gate 83 is connected to the 1 output of the flip-flop FF1, to the 0 output of the flip-flop FF2, to the 0 output of the flip-flop FF3, and to the 1 output of the flip-flop FF4. If the presence of the 1001 coded signal is detected in the flip-flops FF1—FF4 by the "START" SENSING gate 83, an output signal is produced thereby and applied to one input of the AND gate 84. A first shift pulse, corresponding to the START stripe-pair, is then received at the other input of the AND gate 84 from the loading logic circuitry 75 over the SHIFT line, and an output signal is produced by the AND gate 84 and applied to an input of the RESET OR gate 92. The RESET OR gate 92 then operates to reset the stages 2*a*—2*d* through 12*a*—12*d* of the shift registers 80. By employing the START RESET gating arrangement 82 as described hereinabove, the necessity of a special "reset" stripe in the label 12 or a special "reset" signal from other apparatus employed in the system is avoided.

The first shift pulse produced by the loading logic circuitry 75 and applied to the AND gate 84 is also applied simultaneously to the first set of stages 1*a*—1*d* of the shift registers 80 to allow the "START" coded signal temporarily stored in the buffer flip-flops FF1—FF4 to be entered therein. At a fixed duration of time after the first shift pulse is produced, a reset signal is produced by the loading logic circuitry 75 over the RESET FF line to reset the buffer flip-flops FF1—FF4 in preparation for receiving the pulses derived as a result of scanning the next stripe-pair.

In a manner similar to that described hereinabove, the digit stripe-pairs and the STOP stripe-pair are scanned in succession and the light patterns reflected therefrom are converted to pulses, applied to the Schmitt trigger circuits 70 and 71, temporarily stored in succession in the buffer flip-flops FF1—FF4, and shifted by means of successive shift pulses into the shift register 80. In the above connection, it is to be noted that when a white stripe is scanned, whether a first stripe or a second stripe of a stripe-pair, pulses are produced by both of the Schmitt trigger circuits 70 and 71 and applied to the associated ones of the buffer flip-flops FF1—FF4. As mentioned previously, when a black stripe is scanned, no pulses are produced by the orange or blue channel photomultipliers 51 and 52 (FIG. 3*a*) and, accordingly, no pulses are produced by the Schmitt trigger circuit 70 of the Schmitt trigger circuit 71 as a result of scanning such stripe.

After all of the stripe-pairs of the label 12 of FIG. 2 have been scanned and coded signals derived corresponding to the stripe-pairs of the label 12 and stored in the shift registers 80, the binary-represented contents of the sets of stages 1*a*—1*d* through 12*a*—12*d* of the registers 80 are as summarized below:

| | Character and Binary Representations | | | | |
|---|---|---|---|---|---|
| Stages: | | | | | |
| 1a–1d | STOP | 0 | 1 | 1 | 0 |
| 2a–2d | 9 | 1 | 0 | 0 | 1 |
| 3a–3d | 8 | 1 | 1 | 0 | 0 |
| 4a–4d | 7 | 1 | 0 | 1 | 1 |
| 5a–5d | 6 | 1 | 1 | 0 | 1 |
| 6a–6d | 5 | 0 | 1 | 0 | 0 |
| 7a–7d | 4 | 1 | 0 | 1 | 0 |
| 8a–8d | 3 | 1 | 0 | 0 | 0 |
| 9a–9d | 2 | 1 | 1 | 1 | 0 |
| 10a–10d | 1 | 1 | 1 | 1 | 1 |
| 11a–11d | 0 | 0 | 1 | 1 | 1 |
| 12a–12d | START | 1 | 0 | 0 | 1 |

As mentioned previously, after each shift pulse is produced by the loading logic circuitry 75 to transfer a coded signal from the flip-flops FF1—FF4 to the shift registers 80, the shift pulse is tested by the SHIFT PULSE gating arrangement 87 to determine whether it is spaced from the previous shift pulse by a predetermined time duration, the even spacing of the shift pulses being a strong indication that only valid label data has been entered into the shift registers 80. It may be recalled that each shift pulse produced by the loading logic circuitry 75 occurs at a fixed period of time after being set into operation by the leading edge of a pulse produced by the Schmitt trigger circuit 70 or the Schmitt trigger circuit 71 subsequent to the first stripe of a stripe-pair being scanned. It is apparent, therefore, that if the stripe-pairs of the label 12 are properly and correctly scanned and proper pulses are produced at the appropriate times by the Schmitt trigger circuits 70 and 71, the shift pulses produced by the loading logic circuitry 75 occur at evenly-spaced intervals. However, if either of the Schmitt trigger circuits 70 and 71 is operated improperly or in an untimely fashion, as by noise signals caused by foreign matter on the label, by the side of the car on which the label is affixed, rain, snow, etc., the shift pulses produced by the loading logic circuitry 75 will not be evenly-spaced.

The manner in which the SHIFT PULSE gating arrangement 87 operates to determine whether the shift pulses produced by the loading logic circuitry 75 are evenly-spaced is as follows. When a given shift pulse is generated by the loading logic circuitry 75 over the SHIFT line, the shift pulse is applied to the retriggerable one-shot multivibrator 88. The one-shot multivibrator 88 is triggered by the leading edge of the shift pulse to initiate a positive output pulse of a duration substantially equal to the expected duration between the leading edges of a pair of successive shift pulses. The value of this expected duration is dependent on such factors as the width of the stripes of the label under scan, the width of the nonreflecting spacers between the stripe-pairs, the distance of the label from the scanning apparatus, the number of reflective mirror elements on the scanning wheel, and the speed of the scanning wheel which directs the incident scanning beam onto the label. For the above-mentioned ⅜-inch wide stripes, a stripe-pair separation distance of one-half inch, a reading distance of 6 feet, 15 mirrors on the scanning wheel periphery, and a scanning wheel speed of 1200 revolutions per minute, a suitable duration for the one-shot multivibrator 88 is 70 microseconds.

If, after the one-shot multivibrator 88 has been triggered by the given shift pulse, and if before the output pulse of the one-shot multivibrator 88 goes negative, the next shift pulse has retriggered the one-shot multivibrator 88, the output of the one-shot multivibrator 88 remains high, and a high signal is applied to one input of the gate 89. Since the other input of the gate 89 from the READ flip-flop 100 is low at this time, as will become apparent hereinafter, no operation of the gate 89 takes place and no resetting of the shift registers 80 occurs. If, however, the leading edge of the next shift pulse is separated from the leading edge of the previous shift pulse by a duration greater than the duration provided by the one-shot multivibrator 88, the output of the one-shot multivibrator 88 goes low, both inputs to the gate 89 are low, and an output signal is produced by the gate 89 and applied to the RESET OR gate 91. An output signal from the RESET OR gate 91 causes the first set of stages 1a—1d of the shift registers 80 to be reset, and the output signal from the RESET OR gate 92 (via the output of the RESET OR gate 91) causes the rest of the sets of stages 2a—2d through 12a—12d of the registers to be reset. The shift registers 80 are therefore cleared in preparation for receiving new data.

If all the shift pulses produced by the loading logic circuitry 75 are determined to be equally-spaced by the same predetermined amount by the SHIFT PULSE gating arrangement 87, readout of the contents of the shift registers 80 can take place. As mentioned previously, when all the coded signals derived from the label 12 are stored in the sets of stages 1a—1d through 12a—12d of the shift registers 80, the "START" coded signal is present in the last set of stages 12a—12d of the registers 80 and the "STOP" coded signal is present in the first set of stages 1a—1d.

The presence of the "STOP" coded signal (0110) is detected by the "STOP" SENSING gate 96 and, in response to detecting such presence, an output signal is applied by the "-STOP" SENSING gate 96 to the first input of the AND gate 99. The presence of the "START" coded signal (1001) is detected by the "START" SENSING gate 98 and, in response to detecting such presence, an output signal is applied by the "-START" SENSING gate 98 to the second input of the AND gate 99. An output signal is then produced by the AND gate 99 and applied to the READ flip-flop 100 to cause the READ flip-flop 100 to change its operating state. Under this condition, the gate 89 is inhibited by the READ flip-flop 100 such that when the output of the one-shot multivibrator 88 goes low after being triggered by the last shift pulse (corresponding to the STOP stripe-pair), no output is produced by the gate 89 to cause resetting of the shift registers 80 by the RESET OR gates 91 and 92. Also, the READ flip-flop 100 applies a signal on a READ line to the readout apparatus 20 to cause the readout apparatus 20 to generate signals on a READOUT-SHIFT line. The signals on the READOUT-SHIFT line are applied to all of the sets of stages 1a—1d,...., 12a—12d of the shift registers 80 to cause the contents of the registers 80 to be shifted into the readout apparatus 20 over a plurality of READOUT lines. The READ flip-flop 100 also resets the wheel counter logic circuitry 24 via a signal applied to a ZERO RESET line.

Once a vehicle is no longer adjacent to the block signal 22, the ON/OFF control circuitry 21 operates to turn off the readout apparatus 20.

As mentioned previously, a FORBIDDEN SIGNAL AND gate 85 is provided for detecting spurious signals resembling coded signals corresponding to stripe-pairs not employed in the label 12 of FIG. 2. Referring to FIG. 2, it is to be noted that of 16 possible two-stripe combinations that may be formed from the orange, blue, and white retroreflective stripes, and the nonreflecting black stripes, four two-stripe combinations, namely, black-orange (0010), black-blue (0001), black-white (0011), and black-black (0000), are not employed. These specific two-stripe combinations are not employed in the label 12 since the presence of a black first stripe cannot be detected. The ability of the system to detect the first stripe of a stripe-pair is important inasmuch, as it may be recalled, the leading edge of a pulse derived as a result of scanning the first stripe of a stripe-pair causes gating signals corresponding to both stripes of the stripe-pair to be produced by the loading logic circuitry 75. Since each of the above "forbidden" signals 0010, 0001, 0011, and 0000 includes two leading zeros, and since the two leading zeros are stored in the buffer flip-flops FF1 and FF2 (corresponding to a first stripe of a stripe-pair), the FORBIDDEN SIGNAL AND gate 85 senses the presence of the two leading zeros in the buffer flip-flops FF1 and FF2 and in response thereto produces an output signal to the RESET OR gate 91. The RESET OR gate 91 produces an output signal which is applied to the first set of stages 1a—1d of the shift registers 80 to cause resetting of the first set of stages 1a—1d and also to the RESET OR gate 92. The output signal of the RESET OR gate 92 causes resetting of the remaining sets of stages 2a—2d through 12a—12d.

MODIFICATIONS

Although a vehicle identification system has been disclosed which utilizes a coded retroreflective label, a specific two-position base-four coding format, and visible light, it is to be appreciated that the features of the present invention may be employed in systems involving objects other than vehicles, types of labels other than retroreflective labels, types of code formats other than a two-position base-four coding format, and forms of electromagnetic radiation other than visible light.

I claim:

1. A system for processing information relating to an object, comprising:

a plurality of code elements associated with the object and arranged in a predetermined coded pattern to represent in an orderly succession a plurality of items of information relating to the object;

sensing means adapted to sense each item of information encoded in the plurality of code elements and to produce an electrical signal representative thereof;

signal processing means for processing the electrical signals produced by the sensing means;

control signal generating means operative to generate a control signal corresponding to each electrical signal produced by the sensing means; and means operative to compare the time duration between successive ones of the control signals with a predetermined time duration and to clear the signal-processing means of the electrical signals being processed thereby if the time duration between any pair of successive control signals differs from the predetermined time duration.

2. A system in accordance with claim 1 wherein:

the code elements are radiation-reflecting elements; and the sensing means comprises:

means for scanning the radiation-reflecting elements with an incident beam of electromagnetic radiation; and means arranged to receive electromagnetic radiation reflected from the radiation-reflecting elements and operative in response to electromagnetic radiation received after reflection from the radiation-reflecting elements to produce electrical signals representative of the items of information encoded in the plurality of radiation-reflecting elements.

3. A system in accordance with claim 2 wherein the radiation-reflecting elements are retroreflective elements and the electromagnetic radiation is visible light.

4. A system in accordance with claim 1 wherein:

the code elements are selected from retroreflective stripes of a first color, a second color, and a third color, and nonreflecting stripes of a fourth color, said stripes being arranged in a vertical array of different paired combinations of the stripes in accordance with a two-position base-four coding format, each pair of stripes representing a different item of information; and the sensing means comprises:

means for scanning the stripes in succession with a light beam; and means arranged to receive light retroreflected from the stripes and operative in response to light received after reflection from the stripes to produce electrical signals representative of the items of information encoded in the array of stripes.

5. A system in accordance with claim 1 further comprising means operative to sense a respective portion of each electrical signal produced by the sensing means and in response to sensing a portion having a predetermined characteristic to clear the signal-processing means of the electrical signals being processed thereby.

6. A system in accordance with claim 1 wherein:

the signal processing means includes shift register means having a plurality of successive storage sections for storing in succession the electrical signals produced by the sensing means;

said system further comprising means operative in response to sensing a predetermined electrical signal produced by the sensing means and corresponding to the first item of information encoded in the plurality of code elements to reset all but the first storage section in the succession of storage sections.

7. A system in accordance with claim 1 wherein:

the signal-processing means includes shift register means operative to store the electrical signals produced by the sensing means, the shift register means comprising a plurality of storage sections arranged in succession, each storage section corresponding to and storing a different one of the electrical signals representative of the items of information encoded in the plurality of code elements;

said system further comprising means operative to sense the electrical signals stored in the first storage section in the succession of storage sections and in the last storage section in the succession of storage sections and in response to sensing simultaneously the presence of a predetermined first electrical signal stored in the last storage section and representative of the first item of information encoded in the plurality of code elements and a second predetermined electrical signal stored in the first storage section and representative of the last item of information encoded in the plurality of code elements to cause all of the electrical signals stored in the shift register means to be applied to output apparatus.

8. A system in accordance with claim 1 wherein the last-mentioned means includes:

first means operative to receive each control signal generated by the control signal-generating means and to produce a predetermined output signal condition when the time duration between a pair of successive control signals exceeds a predetermined time duration; and second means operative in response to the predetermined output signal condition produced by the first means to clear the signal processing means of the electrical signals being processed thereby.

9. A system in accordance with claim 8 wherein the first means is a retriggerable means operative in response to each control signal generated by the control signal generating means to initiate an output signal of the predetermined time duration, the output signal caused to be initiated by a given control signal terminating if the next control signal is separated with respect to the given control signal by a time duration greater than the predetermined time duration, the predetermined time duration being substantially equal to the expected time duration between successive control signals.

10. In a system for identifying a vehicle, apparatus comprising:

a vertical array of substantially-parallel horizontal reflective stripes carried by the vehicle to be identified, the stripes being of four different colors and arranged in different paired combinations in accordance with a two-position base-four code format to represent in an orderly succession alpha-numeric items of identification information unique to the vehicle;

scanning means for scanning the stripes in succession with a light beam;

optical-electrical means arranged to receive light reflected from the stripes and operative in response to receiving the reflected light from each stripe-pair to produce an electrical signal representative of the item of information encoded in the stripe-pair;

a plurality of storage shift register means for storing the electrical signals produced by the optical-electrical means;

shift signal-generating means operative to generate a shift signal corresponding to each electrical signal for enabling the storage shift register means to store the electrical signal;

retriggerable one-shot multivibrator means operative in response to each shift signal generated by the shift signal generating means to initiate an output signal of a predetermined time duration substantially equal to the expected time duration between successive shift signals, the output signal caused to be initiated by a given shift signal terminating if the next shift signal is separated with respect to the given shift signal by a time duration greater than the predetermined time duration; and gating means operative in response to the termination of an output signal produced by the retriggerable one-shot multivibrator means to cause resetting of the plurality of storage shift register means.

11. In a system for identifying a vehicle, apparatus in accordance with claim 10 wherein:

each of the plurality of storage shift register means comprises a plurality of stages, corresponding stages of the storage shift register means being arranged in sets, each set corresponding to an item of information encoded in the array of stripes;

said system further comprising:

a first gating arrangement operative to sense a respective portion of each of the electrical signals produced by the optical-electrical means and in response to sensing a portion having a predetermined characteristic to cause resetting of all of the sets of stages of the storage shift register means; and a second gating arrangement operative to sense to the electrical signals stored in the first and last sets of stages of the storage shift register means and in response to sensing simultaneously the presence of a first predetermined electrical signal stored in the last set of stages of the storage shift register means and representative of the first item of information encoded in the first stripe-pair of the array of stripes and the presence of a second predetermined electrical signal stored in the first set of stages of the storage shift register means and representative of the last item of information encoded in the last stripe-pair of the array of stripes to cause all of the electrical signals stored in the storage shift register means to be applied to output apparatus.

12. In a system for identifying a vehicle, apparatus in accordance with claim 11 further comprising a third gating arrangement operative to sense the electrical signals produced by the optical-electrical means and in response to sensing the predetermined first electrical signal representative of the first item of information encoded in the first stripe-pair of the array of stripes to cause resetting of all but the first set of stages of storage shift register means.